Feb. 9, 1965 T. J. RIVAS 3,169,023

PROTECTING RUBBER RING FOR PHONOGRAPH RECORDS

Filed March 16, 1962 2 Sheets-Sheet 1

INVENTOR.
TRINO J. RIVAS

BY [signature]

ATTORNEY

INVENTOR.
TRINO J. RIVAS
BY
Zoltan Polachek
ATTORNEY

United States Patent Office 3,169,023
Patented Feb. 9, 1965

3,169,023
PROTECTING RUBBER RING FOR PHONOGRAPH RECORDS
Trino J. Rivas, Av. 2DA Y Transversal 7A 1, Altamire, Caracas, Venezuela
Filed Mar. 16, 1962, Ser. No. 180,202
1 Claim. (Cl. 274—42)

This invention relates to a flexible band protector and shock absorber for phonograph disk records.

The invention has as a principal object to provide a disk record with a peripheral band extending axially of the record on both sides thereof, so that a plurality of records can be stacked without contacting each other.

A further object is to provide a disk record with both a peripheral band and centrally located resilient washers or rings mounted on opposite sides of the record.

Another object is to provide an endless band for protecting a disk record, the band having a plurality of circumferential grooves to increase flexibility of the band and to increase frictional gripping of bands on adjacent records to prevent relative slippage.

A still further object is to provide peripheral protective means on a disk record for preventing a needle carrying tone arm of an automatic record changer from riding off the outer periphery of the record.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
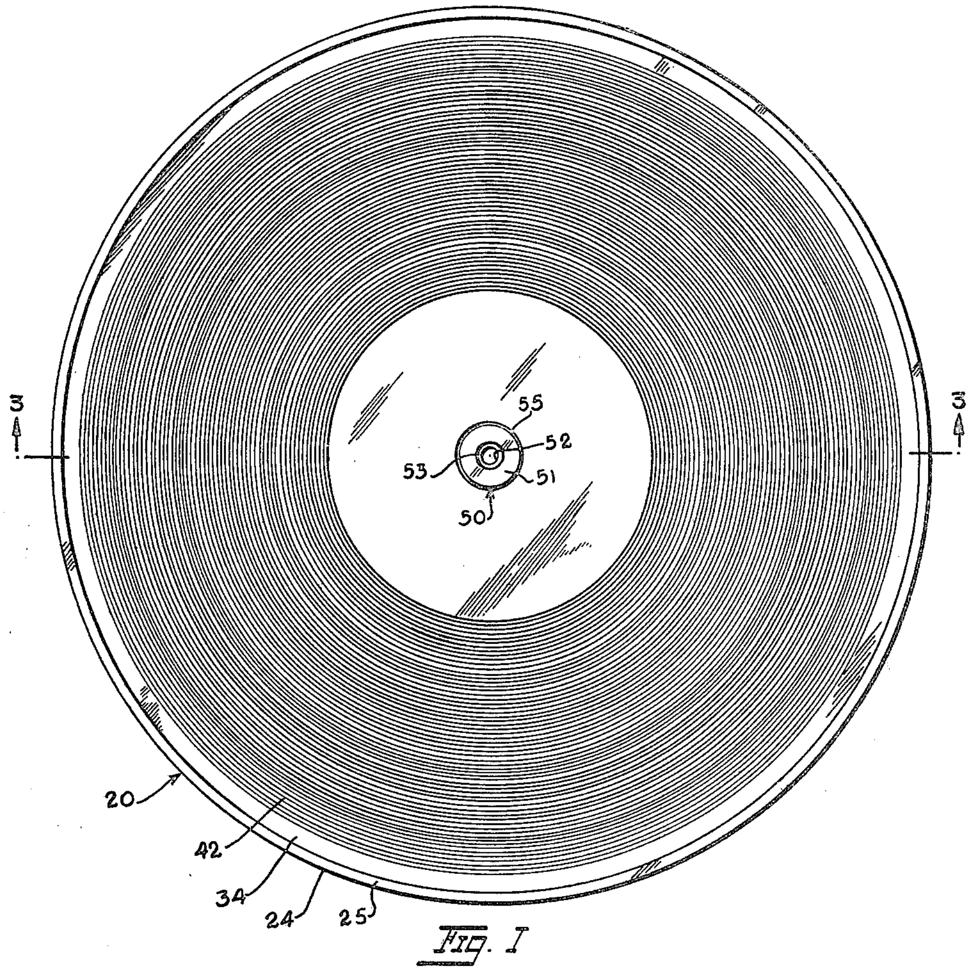
FIG. 1 is a top plan view of a disk record equipped with protective devices according to the invention.

Referring to FIGS. 1, 2, 3, 5 and 6, there is shown an endless band 20, provided with an inner circumferential groove 22 and an outer rounded circumferential side 24. On opposed annular surfaces 25 of the band are concentric grooves 28. The band may be somewhat thinner axially at the radially inner portions and may flare slightly outward axially in thickness to the outer side 24. Two opposing endless ridges 30 are formed at the radially inner side of the band at the free edges of the groove 22.

Figure 2:
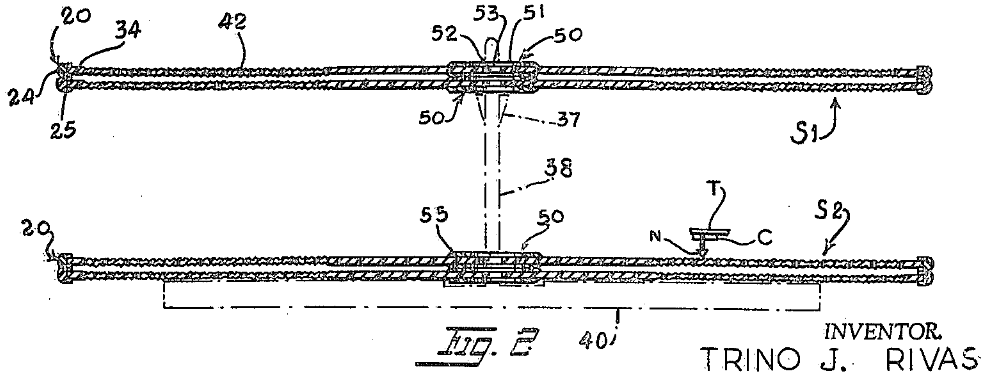
FIG. 2 is a cross-sectional view of two stacks of disk records equipped with protective devices and mounted on a spindle of an automatic record changer and on a turntable, the spindle and turntable being shown in dotted lines.
Figures 3, 4, 7, 9:
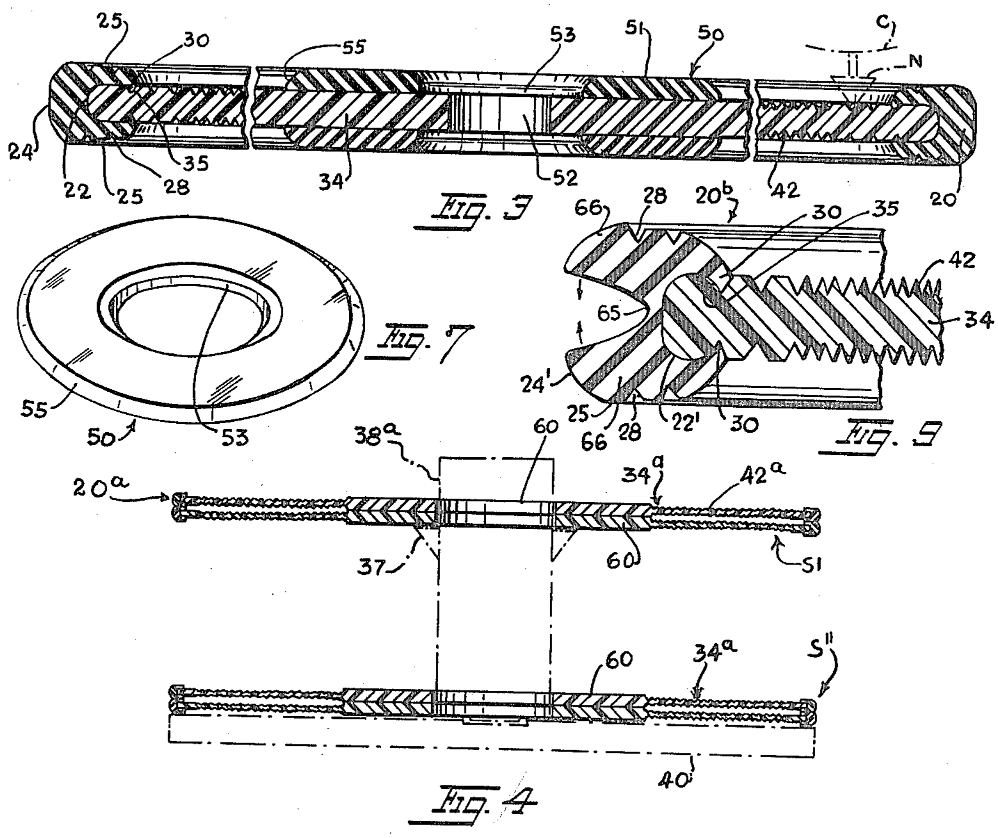
FIG. 3 is a cross-sectional view on an enlarged scale, taken on line 3—3 of FIG. 1, parts of the record and protective band being broken away.
FIG. 4 is a cross-sectional view of two other stacks of disk records equipped with protective peripheral bands and mounted on a spindle and turntable of another record changer, the spindle and turntable being shown in dotted lines.
FIG. 7 is a perspective view of a protective ring according to the invention.
FIG. 9 is a sectional view similar to FIG. 5 showing another modified form of band and part of a disk record.
Figure 5:
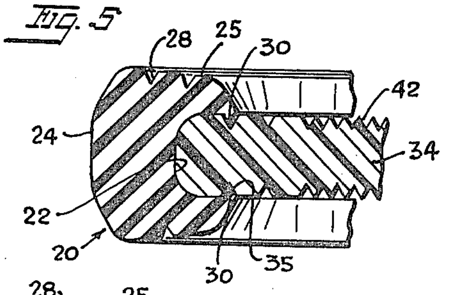
FIG. 5 is a sectional view similar to a portion of FIG. 3 on a much larger scale, including portions of the disk record of a modified form of protective band.

In FIGS. 2, 3 and 5, the band is shown mounted on the outer periphery 33 of a circular phonograph disk record 34. The outer sides or surfaces 25 of the band extend axially beyond the flat sides of the record. The ridges 30 engage in the outermost record groove portions 35 which in a conventional record carry no sound recordings.

FIG. 2 shows two stacks of records S1 and S2. The upper stack S1 is supported on fingers 37 near the top of a spindle 38. The lower stack S2 rests on a horizontal turntable 40. The records in both the upper and lower stacks are axially spaced and separated by adjacent superimposed bands 20 engaged on the peripheries of the records. This spacing protects the fine grooves 42 of the opposing sides of adjacent records from rubbing and scratching each other and from depositing dirt, dust and debris on each other by contact. The grooves 28 on the sides of the juxtaposed bands prevent relative sliding and circumferential slippage of the adjacent records and facilitate mounting the bands on the records.

The records are further provided with central protective rings 50 shown to best advantage in FIGS. 1, 2, 3 and 7. These rings are flat flexible rubber or felt members secured to opposite sides of the records at the central holes 52 by suitable adhesive (not shown). Each ring 50 has such a thickness that its outer side 51 is coplanar with the outer edge of a band surface 25. Thus, the combined thickness of both rings and the disk record 34 is equal to the maximum thickness of the record, as best shown in FIG. 3. The lower ring 50 at the underside of the bottom record in record stack S1 is engaged by fingers 37 of the record changer spindle. Thus, this ring serves as a flexible protective support preventing chipping and cutting of the bottom record by the fingers 37. The rings 50 on the upper records of the stacks S1 and S2 also serve as spacers and supplement the ring bands 20 in keeping the stacked records spaced apart. The ring 50 has an inner hole 53 somewhat larger in diameter than the small central hole 52 in the record 34. The edges of hole 53 and the outer periphery 55 of the ring are beveled to avoid presenting sharp edges to juxtaposed rings 50 and to prevent the needle N carried by cartridge C underneath tone arm T from catching on the ring at the end of play of the uppermost record on the turntable 40; see FIGS. 2 and 3.

Figure 8:
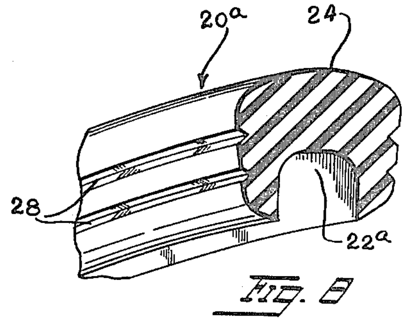
FIG. 8 is a sectional view similar to a portion of FIG. 6 showing details of the protective band employed in FIG. 4.
Figure 6:
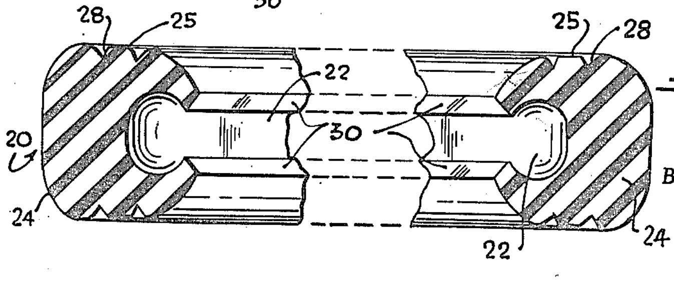
FIG. 6 is a sectional view similar to portions of FIG. 3 on a much larger scale of the form of FIG. 5 with parts of the disk record omitted.

FIGS. 4 and 8 show another construction in which the endless band $20^a$ has the same structure as band 20, but ridges 30 are omitted so that the sides of groove $22^a$ inside the band are smooth and flat. The band has outer circumferential, concentric grooves 28 which increase flexibility of the band to facilitate placing the band on a record $34^a$ and taking it off. Records $34^a$ have thickened circular inner portions 60 which abut each other at the centers of the records and prevent contact between the grooves $42^a$ in the records. The bands $20^a$ in stacks S′ and S″ shown in FIG. 4 serve to prevent circumferential slippage and provide support to the records at their peripheries. Records $34^a$ are of conventional type having large central openings 62 to receive spindle $38^a$ and are generally played at forty-five revolutions per minute. Records 34 with smaller holes 52 are played at conventional speeds of sixteen, thirty-three and seventy-eight revolutions per minute.

In FIG. 9 is shown another band $20^b$ which is similar to band 20 and corresponding parts are identically numbered. Band $20^b$ has a circumferential groove 65 formed in its outer side 24′. This groove lies between two circumferential ridges 66 at opposite sides of the band. These ridges can be squeezed together manually to disengage the ridges 30 from the groove portions 35 at opposite sides of the disk record 34. This facilitates removing the band from the record. By squeezing the ridges 66 together to separate the inner ridges 30, mounting of the band on the periphery of record 34 in groove 22' is also facilitated.

The bands 20, $20^a$ and $20^b$ should have smaller diameters than the disk records upon which they are to be mounted and the bands should be elastic to stretch and fit tightly on the peripheries of the records. The bands lengthen the useful lives of the records upon which they are mounted, serve as shock absorbers and spacers, provide finger grips for safe handling of records, and serve as slippage reducers to prevent sliding of the records circumferentially with respect to each other and with respect to the turntable on which the records are played.

It is possible to fabricate the endless bands of material such as plastic or felt which are less elastic than rubber. When such materials are used the bands will have to be cemented to the peripheries of the records. It is preferred, however, that the bands be made of elastic rubber material so that they can be removed from the records if desired and can be attached to the records without use of adhesive.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A protective device for a disk record having a circular body with grooves in opposite surfaces thereof near the periphery of the body, said device comprising an endless flexible band having a circumferential groove formed on its inner side to engage the periphery of the body, said band having ridges formed at free edges of the groove to engage in the grooves in opposite surfaces of the body, said band having a diameter inside said groove less than the diameter of the body, said band being sufficiently elastic to stretch to the diameter of the record for gripping the periphery of the body in tension when mounted thereon, said band having an outer annular edge formed with a circumferential groove defined between two other opposing external ridges, the external ridges being squeezable together to separate the ridges at the edges of the groove and facilitate mounting the band on the periphery of the body and demounting the band therefrom, said band having opposite sides formed with radially spaced circumferential grooves to increase flexibility of the band and to prevent lateral slippage of stacked records, said band having an axial thickness greater than the thickness of the body to provide annular projections at both sides of the periphery of the body of the record.

References Cited by the Examiner

UNITED STATES PATENTS

| | | | |
|---|---|---|---|
| 2,600,573 | 6/52 | Rabkin | 274—42 |
| 3,042,413 | 7/62 | Frink | 274—42 |

FOREIGN PATENTS

| | | |
|---|---|---|
| 883,811 | 7/53 | Germany. |
| 335,768 | 10/30 | Great Britain. |
| 667,486 | 3/52 | Great Britain. |

LOUIS J. CAPOZI, *Primary Examiner.*

ANTONIA F. GUIDA, *Examiner.*